No. 783,271. PATENTED FEB. 21, 1905.
H. W. HERBST.
MACHINE FOR CLOSING THE BOTTOMS OF COLLAPSIBLE TUBES.
APPLICATION FILED NOV. 2, 1903.

5 SHEETS—SHEET 1.

No. 783,271. PATENTED FEB. 21, 1905.
H. W. HERBST.
MACHINE FOR CLOSING THE BOTTOMS OF COLLAPSIBLE TUBES.
APPLICATION FILED NOV. 2, 1903.
5 SHEETS—SHEET 2.
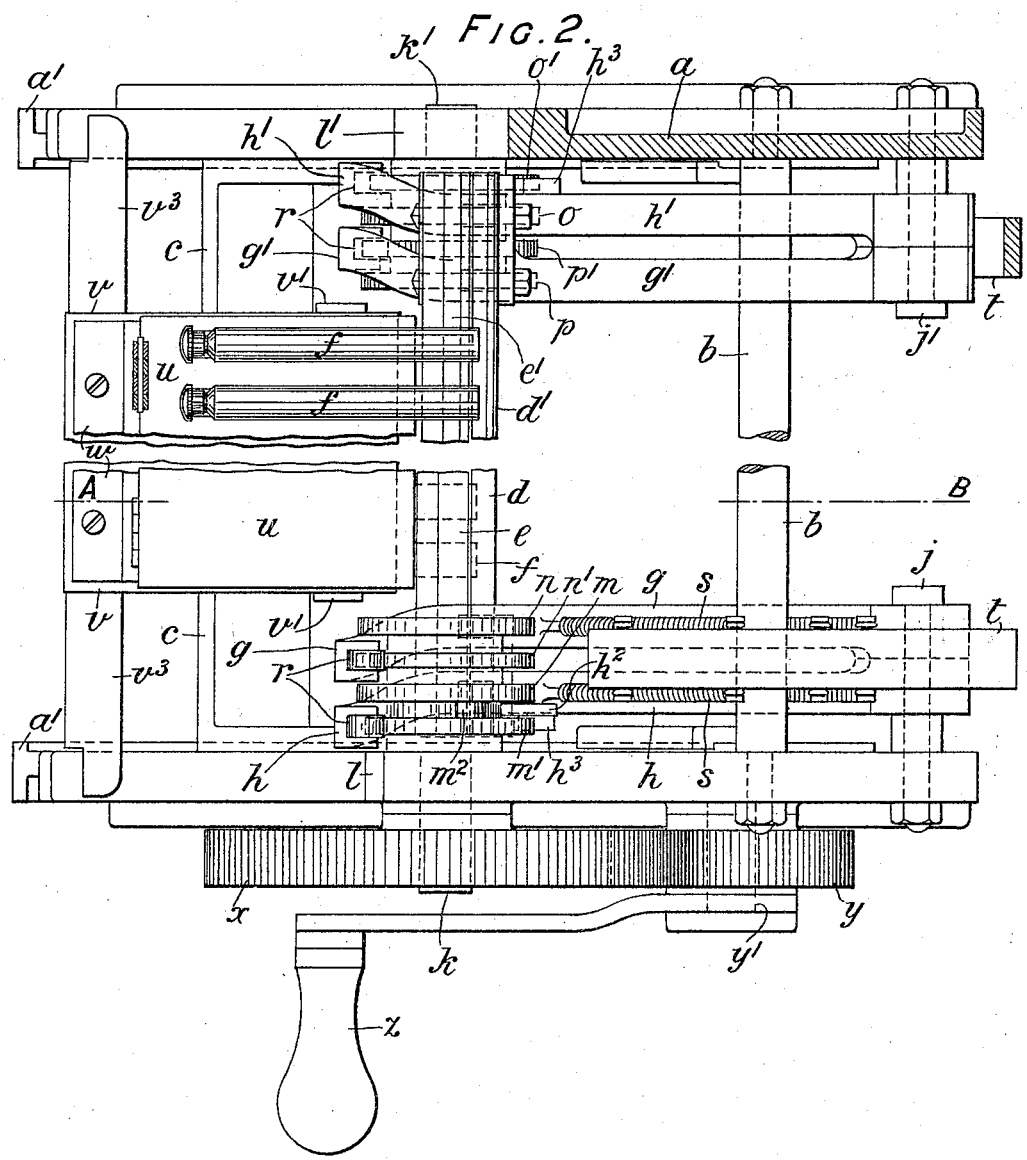

No. 783,271. PATENTED FEB. 21, 1905.
H. W. HERBST.
MACHINE FOR CLOSING THE BOTTOMS OF COLLAPSIBLE TUBES.
APPLICATION FILED NOV. 2, 1903.
5 SHEETS—SHEET 3.
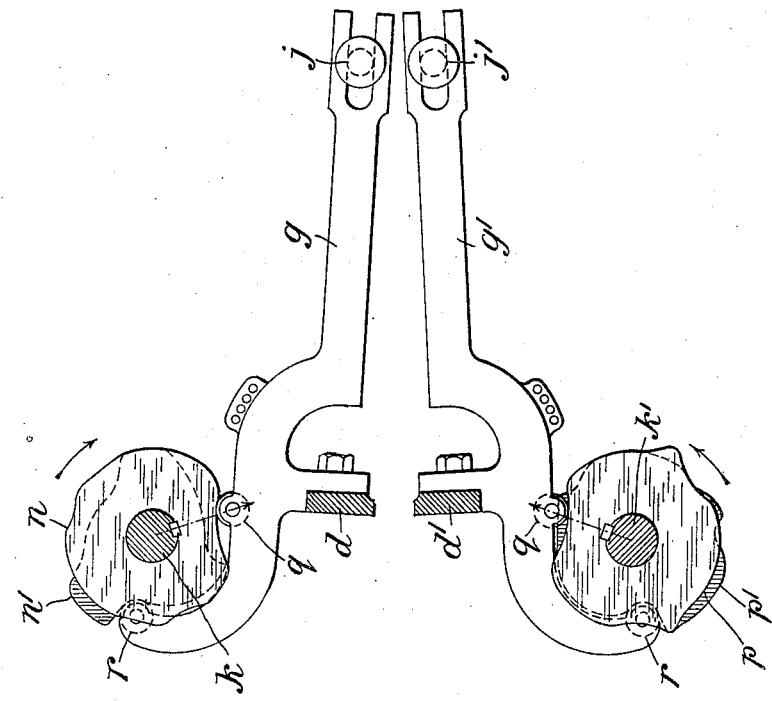
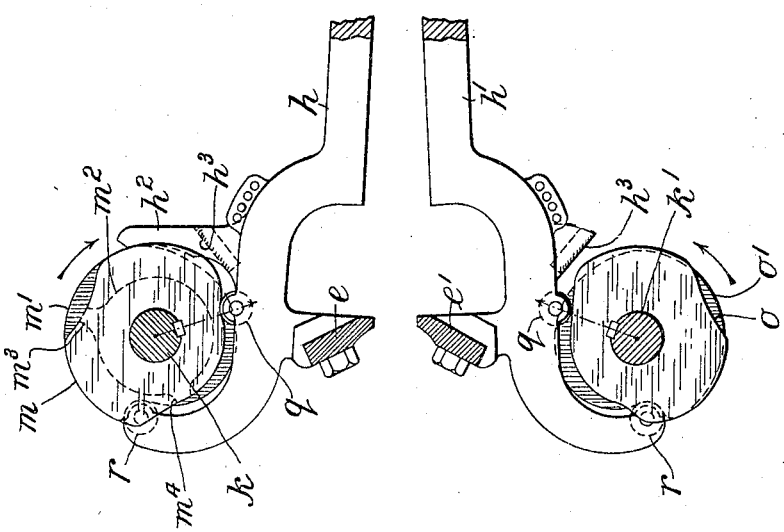

No. 783,271. PATENTED FEB. 21, 1905.
H. W. HERBST.
MACHINE FOR CLOSING THE BOTTOMS OF COLLAPSIBLE TUBES.
APPLICATION FILED NOV. 2, 1903.

5 SHEETS—SHEET 4.

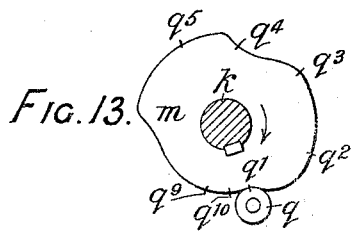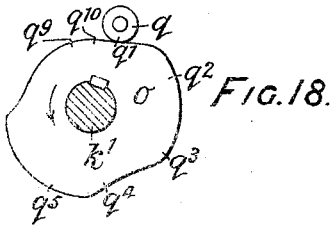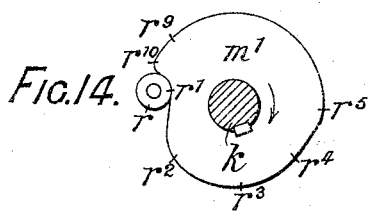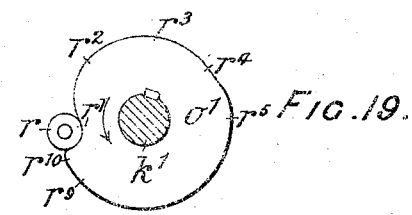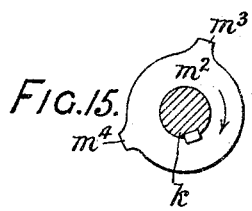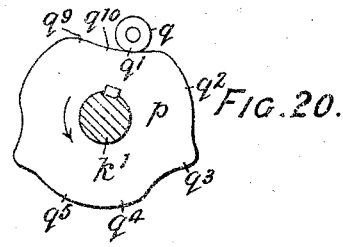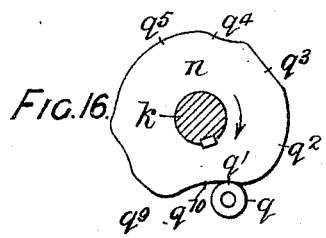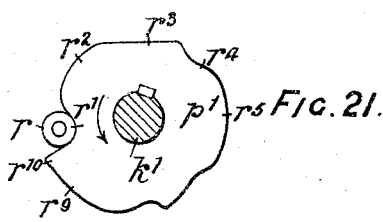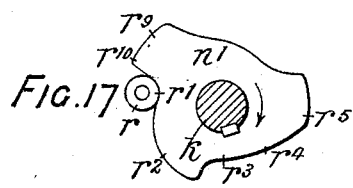

No. 783,271. Patented February 21, 1905.

UNITED STATES PATENT OFFICE.

HENRY WILLIAM HERBST, OF LONDON, ENGLAND, ASSIGNOR TO BETTS AND COMPANY, LIMITED, OF LONDON, ENGLAND.

MACHINE FOR CLOSING THE BOTTOMS OF COLLAPSIBLE TUBES.

SPECIFICATION forming part of Letters Patent No. 783,271, dated February 21, 1905.

Application filed November 2, 1903. Serial No. 179,554.

*To all whom it may concern:*

Be it known that I, HENRY WILLIAM HERBST, a subject of the King of Great Britain, residing at London, in the county of Middlesex, England, have invented a new and useful Machine for Closing the Bottoms of Collapsible Tubes, of which the following is a specification.

This invention relates to a machine whereby collapsible tubes such as are used for artists' colors, shaving-creams, and analogous preparations can have their bottoms rapidly and effectively closed, turned up, folded over, and "upset" or swelled out after such tubes have been charged with the preparation which they are intended to contain.

A machine embodying the invention comprises two juxtaposed pairs of bars, forming jaws adapted to act upon any desired number of tubes simultaneously, means for holding the tubes in position to be operated upon, levers arranged in pairs and carrying the said bars, and suitably-shaped cams arranged in sets, each set adapted to act on its corresponding lever at the proper moment, and thereby impart the requisite movements to the bars to cause them to perform their respective functions, means, such as springs or the like, being provided to keep the levers against said cams, and the cams being mounted on shafts geared together and driven by hand or by power.

The invention also comprises means for locking the levers of a certain bar (or bars) to prevent it (or them) from shifting while the operation of "turning up" the closed bottoms of the tubes is taking place.

It further comprises means for preventing the momentum of the bars from acting to increase the requisite extent of upset when the machine is being worked rapidly.

Figure 1:
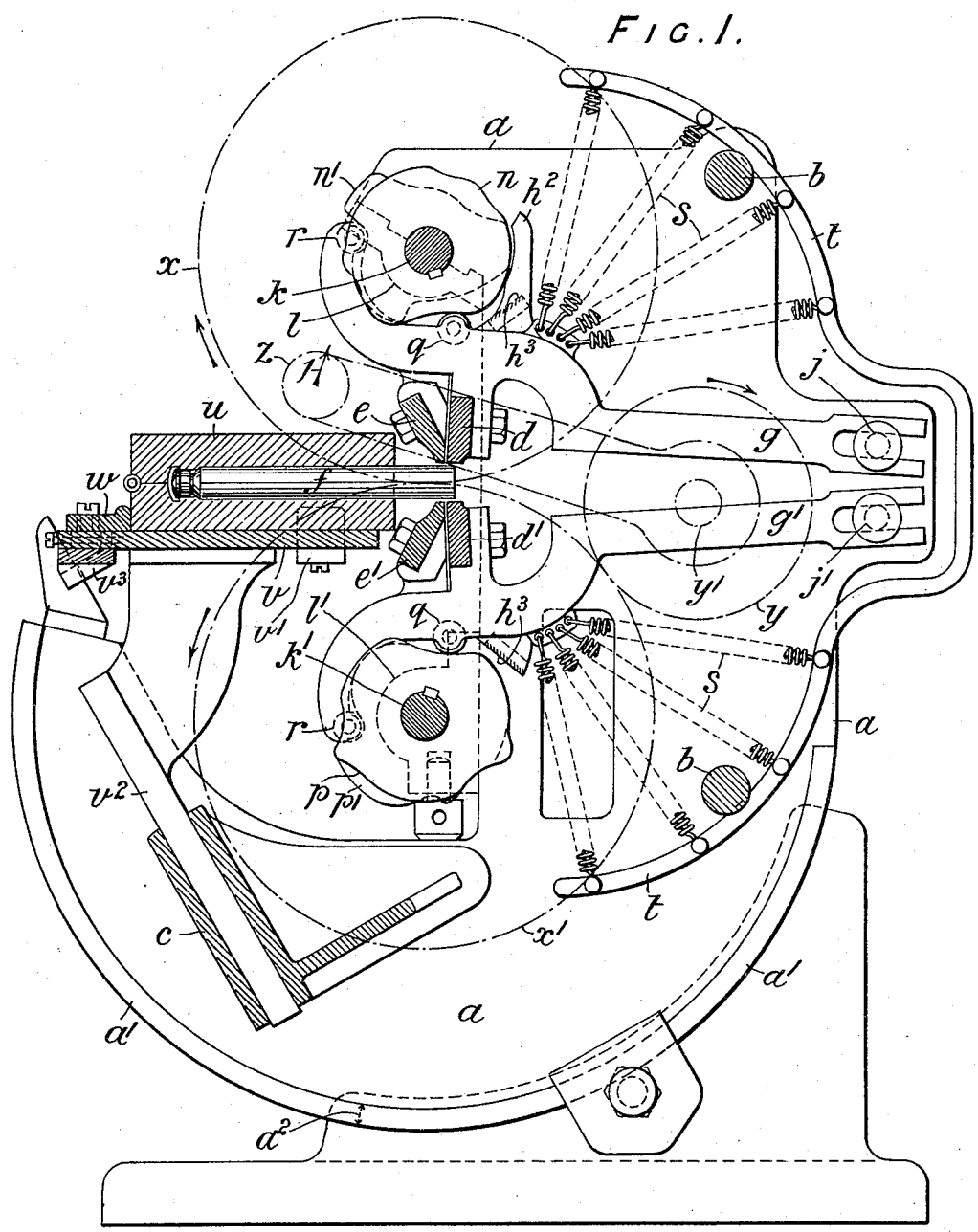

Referring to the annexed drawings, Figure 1 is a vertical cross-section of the machine on the line A B of Fig. 2; and Fig. 2 is a plan, partly in section. Fig. 3 shows the cams and levers of the front pair of bars, and Fig. 4 shows those of the back pair. Figs. 5 to 12 are diagrammatic views showing the positions of the bars relatively to each other and to the tubes at the different stages of the operations and the corresponding conditions of the bottoms of the tubes. Figs. 13 to 21 show the cams detached.

The machine consists of two side frames $a$, braced together by tie-rods $b$ and a cross-piece $c$. Extending longitudinally and about centrally of the machine are two juxtaposed pairs of bars $d\ d'\ e\ e'$, forming jaws, and each bar having an independent movement, as hereinafter explained. Between these jaws the bottoms of the collapsible tubes $f$ are located so as to be readily operated upon simultaneously. Each bar is fixed to a pair of levers, the bar $d$ being fixed to the pair $g$, the bar $d'$ to the pair $g'$, the bar $e$ to the pair $h$, and the bar $e'$ to the pair $h'$. All these levers have slots at their outer ends to receive pins $j\ j''$, about which they pivot, and said pins are fixed to the frames of the machine.

Parallel with the bars and equidistant from them are two shafts $k\ k'$, mounted to rotate in bearings $l\ l'$ in the frames $a$, the bearings $l'$ being made adjustable. Keyed to the shaft $k$ at each end is a set of cams $m\ m'\ m^2\ n\ n'$, Figs. 13 to 17, the cams $m\ m'\ m^2$ acting on the levers $h$ and the cams $n\ n'$ acting on the levers $g$. Similarly keyed to the shaft $k'$ at each end is a set of cams $o\ o'\ p\ p'$, the cams $o\ o'$ acting on the levers $h'$ and the cams $p\ p'$ acting on the levers $g'$. The cams $m\ n\ o\ p$ act through friction-rollers $q$ (mounted in the levers) and springs $s$ to impart movements to the levers to open and close the jaws, and the cams $m'\ n'\ o'\ p'$ act through friction-rollers $r$ (also mounted in the levers) and springs $s$ to impart longitudinal movements to the levers, the simultaneous action of these cams thus producing a compound movement of the levers and bars.

The levers are kept in operative contact with the cams by the springs $s$, the outer ends of which are attached to a bar $t$, rigidly secured to the tie-rods $b$, and the inner ends to the levers themselves; but any other suitable means may be employed for the purpose.

It will be noticed that each of the various levers $g\ g'\ h\ h'$ has two contacting devices, which it presents to the respective cams—viz., the rollers $q$ and $r$, the rollers $q$ $q$, coöperating with the cams that impart angular motion to the levers for closing the jaws, and the rollers $r$ $r$, coöperating with the cams that impart longitudinal motion to the said levers. As regards the cam $r$ of the lever $h$ it will be seen that as it is located in front of its cams it is incapable of preventing the bar $e$ from yielding when the end of the tube is pressed against the said bar in the turning-up action. (See Fig. 8.) As, moreover, the respective spring $s$ is liable to be of insufficient strength for this purpose, it being undesirable to have the springs $s$ $s$ too powerful, the effect produced by the turning-up action would be uncertain and irregular unless additional means were provided for locking the bar $e$ firmly in position at the desired times. These means are shown in Figs. 1 and 3 and include the arm $h^2$, as about to be fully described.

When the bottoms of the tubes are turned up, they bear against the bar $e$, which forms an abutment. Consequently said bar is subjected to a considerable pressure, which is only resisted by the springs $s$. In order to lock the bar, and thus provide a positive unyielding abutment, there is fixed to each of the levers $h$ an arm $h^2$, which bears either against a nose $m^3$ or a nose $m^4$ on the cams $m^2$, while the turning up is taking place, thus preventing any movement of the bar $e$ should the pressure on said bar be such as to overcome the tension of the springs $s$. The bar $e'$ may also be locked in a similar manner.

The bars $e$ $e'$ are advantageously inclined to the bars $d$ $d'$, as shown in Fig. 1, to facilitate the removal of any substance that may be extruded from the tubes when being operated on; but it is obvious that the bars may be parallel.

In case the machine be worked at great speed the bars when in the act of "upsetting", or swelling out the bottoms of the tubes are liable to acquire a momentum sufficient to overcome the pull of the springs $s$ and by descending too far would unduly increase the requisite amount of upset. In order to prevent this, the levers $h$ $h'$ are each provided with a lug $h^3$, so arranged as to contact at the moment when the upset is completed with the cams $m'$ $o'$, and thus prevent any further movement of the said bars that would otherwise be produced by their momentum.

The tubes are carried in a portable holder $u$, formed of longitudinal parts hinged together, each part having corresponding grooves to receive the tubes. The holder is placed upon a table $v$ between ears $v'$ at right angles to the bars $d$ $d'$ $e$ $e'$ and bears against a ledge $w$, rendered adjustable by any suitable means. When the tubes are located in position to be operated on, their bottom ends project between the jaws, the ledge $w$ having been previously adjusted so that the said tube ends project to the proper extent.

The table $v$ is fixed to a bar $v^2$, adapted to slide in the cross-piece $c$ of the frames $a$, so that it can be readily detached from the machine, and the said table is also provided with a bar $v^3$, adapted to rest on the frame.

The shafts $k$ $k'$ project from one side of the machine and are geared together by spur-wheels $x$ $x'$ of equal diameter, and gearing with one of these wheels is another spur-wheel $y$, mounted on a fixed stud $y'$ and carrying a crank-handle $z$, by means of which it is rotated and motion communicated to the various parts of the machine. If desired, the machine can be adapted to be driven by power.

The inclination of the machine can be adjusted so that when operating upon tubes containing liquids the said tubes may be presented to the jaws in a more or less vertical position. This may be effected by providing the frames $a$ with flanges $a'$, adapted to slide in and be clamped to a curved groove $a^2$, formed in the base of the machine.

The machine hereinbefore described is designed to "turn over" or "fold" the bottom ends of the tubes twice; but it is obvious that it may be arranged to turn them over three or more times by suitably shaping the cams to this end.

Figure 5:
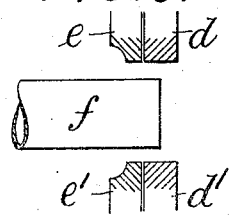
Figure 9:
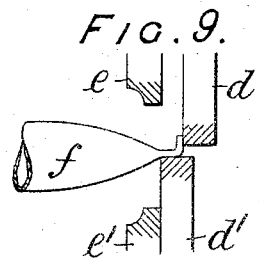
Figure 6:
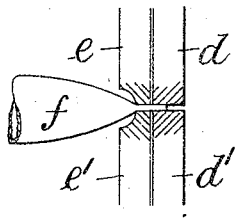
Figure 10:
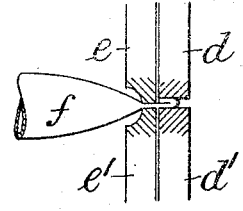
Figure 7:
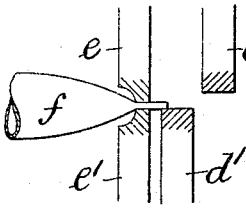
Figure 11:
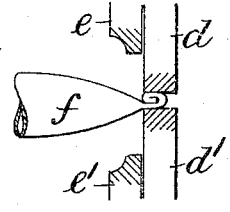
Figure 8:
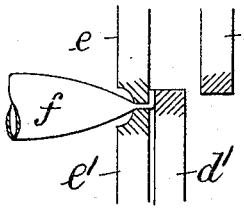
Figure 12:
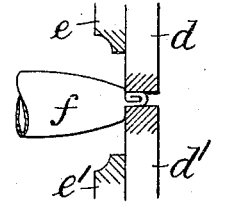

The working is as follows: When the machine is in its normal state, the pairs of bars $d$ $d'$ $e$ $e'$ (forming the jaws) are open, and the parts $q'$ of the cams $m$ $n$ $o$ $p$, Figs. 13, 16, 18, and 20, and the parts $r'$ of the cams $m'$ $n'$ $o'$ $p'$ (see Figs. 14, 17, 19, and 21) are respectively opposite the rollers $q$ and $r$, through which they actuate their respective levers and the bars connected thereto. The tubes to be operated on are placed in the holder $u$ so that their bottom ends come between the said jaws, as shown in Figs. 1 and 5. The handle $z$ is then turned in the direction shown by the arrow 1, Fig. 1, and the cams rotated, when the parts from $q'$ to $q^2$ and $r'$ to $r^2$ of said cams act to bring the jaws together, and so flatten and close up the bottom ends of the tubes, as shown in Fig. 6. Then the parts from $q^2$ to $q^3$ and $r^2$ to $r^3$ of the cams come into action and cause the bars $e$ $e'$ to be held in the closed position and the bar $d$ to retire and the bar $d'$ to first move slightly backward, as shown in Fig. 7, and then to rise in a curved path toward the bar $e$, thus turning up a portion of the closed ends, as shown in Fig. 8, the bar $e$ being in the meantime locked by the nose $m^3$ on the cams $m^2$ bearing against the arm $h^2$ of the levers $h$, which carry said bar. Next the parts $q^3$ to $q^4$ and $r^3$ to $r^4$ of the cams come into action and cause the bar $d'$ to descend and the bars $e$ $e'$ to open and all the bars to travel forward to an extent equal to the depth of a turn over or fold, after which the bar $d'$ is caused to first move upward to raise the portion of the tubes operated upon and then to descend again, the bar $d$ in the meantime advancing up to the "turned-up" portion of the tube, the relative positions of the bars at this moment being shown in Fig. 9. Then the parts $q^4$ to $q^5$ and $r^4$ to $r^5$ of the cams come into action, and the bar $d$ is caused to complete its advancing movement and effect the "turning over" or "folding," and then all the bars are caused to close together, as shown in Fig. 10, the bars $e\ e'$ in so doing flattening a fresh portion of each of the tubes in readiness for the second turning over or folding. The relative movements of the bars for effecting the second turning over or folding of the ends of the tubes are similar to those already described and shown in Figs. 7, 8, and 9 for effecting the first turn over or fold, but with this exception, that on the completion of the second turning over the bars $e\ e'$ remain open and only the bars $d\ d'$ close together, as shown in Fig. 11. These movements are caused by the parts $q^5$ to $q^9$ and $r^5$ to $r^9$ of the cams $m\ n\ o\ p$ and $m'\ n'\ o'\ p'$, respectively, the nose $m^4$ of the cams $m^2$ acting to lock the bar $e$ in the same manner as did the nose $m^3$ in the first folding. When the parts $q^9$ to $q^{10}$ and $r^9$ to $r^{10}$ of said cams come into action, all the bars are caused to travel forward and effect the upsetting or "swelling out" of the lower ends of all the tubes, as shown in Fig. 12. This completes the cycle of operations on the tubes, and the remaining parts $q^{10}$ to $q'$ and $r^{10}$ to $r'$ of the cams restore the bars to their normal or initial position, as shown in Figs. 1, 2, 3, and 4, whereupon the finished tubes can be removed, and the machine is then ready to act upon another series of tubes.

Having now described my invention, what I claim, and desire to secure by Letters Patent, is—

1. A machine for closing, turning up, folding over, and "upsetting" or swelling out the bottoms of collapsible tubes comprising juxtaposed pairs of bars forming jaws adapted to act upon said tubes simultaneously, means for imparting the requisite movements to the bars, and means for holding the tubes in position to be operated upon by said bars.

2. In a machine of the kind stated, the combination of bars constituting a plurality of coöperative juxtaposed pairs of jaws, movable supports for said bars, and means for moving each of said supports independently of the others and in different directions.

3. In a machine of the kind stated, the combination of bars constituting a plurality of normally juxtaposed pairs of jaws, means for closing said jaws in common upon a tube introduced between them, means for opening one of said pairs while the other remains closed, means for causing the jaws of the opened pair to recede independent distances from the closed pair, means for causing one of said opened jaws to turn over the projecting end of the tube, means for opening the other pair of jaws, and means for bringing one of the pairs of jaws together upon the turned-up portion of the tube to flatten or fold over said turned-up portion.

4. In a machine of the kind stated, the combination of a plurality of coöperative pairs of jaws, a lever connected with each jaw, supports therefor permitting each bar to move in more than one direction, rotary cam-shafts for the opposite jaws, and cams thereon for independently actuating the various levers.

5. In a machine of the kind stated, two juxtaposed pairs of bars constituting jaws, means for holding the tubes in proximity to said jaws to be operated on thereby, levers arranged in pairs and carrying said bars, a set of cams for each lever, means for actuating said sets of cams in proper relation to each other, and means for continuously holding the levers in operative relation to their respective cams.

6. In a machine of the kind stated, the combination of two pairs of jaws, means for holding the tubes to said jaws, means for closing both pairs of jaws upon said tubes, means for shifting the jaws of one pair relatively to the other so as to turn up the flattened end of the tube, and means for keeping one jaw of the other pair locked in position while the said end is being turned up.

7. In a machine of the kind stated, the combination of a plurality of pairs of jaws, means for holding tubes in a position to be operated on by said jaws, means for closing said pairs of jaws approximately simultaneously upon a portion of the tubes to flatten same, means for causing one of the pairs of jaws to coöperate for turning up a part of the flattened portion, one jaw of the other pair forming an abutment against which the said part of the tube is turned up, and means for locking the said abutment-forming jaw in place during the turning-up action.

8. In a machine of the kind stated, the combination with a tube-holder, of bars forming two pairs of jaws, levers carrying said bars, cams adapted to actuate said levers, cam-shafts carrying said cams, a stop-arm on one of said levers, and a cam on one of said cam-shafts, and a nose on said cam adapted to engage said stop-arm to temporarily lock one pair of jaws.

9. In a machine of the kind stated, the combination with a tube-holder, of bars constituting two pairs of jaws, levers carrying said bars and having a compound movement, cams for imparting angular motion to said levers so as to open and close said jaws at predetermined times, cams for imparting longitudinal motion to said levers at predetermined times, and stops on two of said levers coöperating with the corresponding cams to prevent excessive longitudinal movement of the levers.

10. The combination of a plurality of pairs of jaws, means for holding and presenting tubes to said jaws, means for closing said jaws upon a given portion of said tubes so as to flatten said portion, means for temporarily locking one pair of jaws in its closed position, means for causing the other pair of jaws to turn up the end of the flattened portion of the tube, means for closing one of the pairs of jaws upon the flattened portion of the tubes so as to fold the same over, and means for "upsetting" the bottoms of the tubes by means of a movement of the jaws relatively to the tubes.

11. The combination of a plurality of pairs of jaws, a detachable holder for presenting tubes thereto, levers operating said jaws, and a plurality of sets of coöperative rotary cams operating said levers, said cams having their respective peripheries so shaped that a plurality of times during a revolution of said cams said peripheries act upon the levers to impart to them a succession or cycle of movements comprising closing both pairs of jaws upon a portion of the tubes, temporarily locking one pair in its closed position, turning up by means of the other pair the ends of the tubes, and folding over the turned-up ends.

12. The combination of a detachable holder for a plurality of tubes arranged side by side, two pairs of bars constituting jaws arranged in operative proximity to the holder and of a width sufficient to extend across all the tubes in said holder, longitudinally-movable pivoted levers connected to said bars, two cam-shafts, cams on said shafts, said cam-shafts and cams being arranged in operative relation to the aforesaid levers, and devices for yieldingly maintaining the various levers and their respective cams in operative relation to each other.

13. In a machine of the kind stated, the combination with a tube-holder, of a plurality of pairs of jaws, a lever connected with each jaw, pivots for said levers, means for permitting to each lever a limited longitudinal movement independent of its pivotal movement, a separate cam for each lever for imparting longitudinal movement to said lever, a separate cam for each lever for imparting pivotal or angular movement to said lever, and means for actuating said cams in definite relations with each other.

14. In a machine of the kind stated, the combination of a tube-holder, bars constituting a plurality of pairs of jaws of which those on the same side of the central line are inclined at an angle to each other, levers supporting said jaws and each capable of movement in two directions, cams for each lever, each cam having operative contact with its lever at one point to actuate the same in one of the two directions, means for holding the levers in contact with their cams, means for operating the cams, and means for causing a relative approach between one pair of jaws and the holder so as to "upset" the bottoms of the tubes.

15. In a machine of the kind stated, the combination of a plurality of jaws arranged in juxtaposed pairs, of which the jaws of one pair are at an angle to those of the other pair, cams for operating said jaws, movable supports for said jaws, interposed between the cams and the jaws, each support having two differently-directed contacting devices presented to its cams for moving said support in two directions, a holder for presenting the tubes to the jaws with the bottom ends of said tubes exposed, means coöperating with the cams for moving the jaws relatively to the holder, and means for limiting the extent of such movement.

16. In a machine of the kind stated, the combination of two pairs of jaws, a tube-holder in operative proximity to said jaws, a movable support having a compound movement for each of said jaws, means for imparting to said jaws, through the intervention of their said supports, movements whereby said jaws twice in sequence flatten, turn up, and fold over the ends of the tubes presented to said jaws by the holder, and means for actuating the appropriate pair of jaws so as to "upset" the bottoms of the tubes.

17. A machine for closing, turning up, folding over, and "upsetting" the bottoms of collapsible tubes, comprising, as its essential instrumentalities, two juxtaposed pairs of bars forming jaws adapted to operate on the said tubes, levers arranged in pairs and carrying said bars, said levers being so pivoted as to be capable of a compound movement, cams arranged in sets and each set adapted to act on its corresponding lever to impart the requisite movements to the bars, springs for keeping the levers in operative position against the cams, a detachable holder containing the tubes and so disposed that the bottom ends of the said tubes are presented centrally between the two pairs of bars, and means for imparting motion to the machine.

In witness whereof I have hereunto signed my name in the presence of two subscribing witnesses.

HENRY WILLIAM HERBST.

Witnesses:
 ELIZA HERBST,
 GEORGE ERNEST MINTERN.